INVENTOR
DAVID J. McHAFFIE
BY
ATTORNEYS

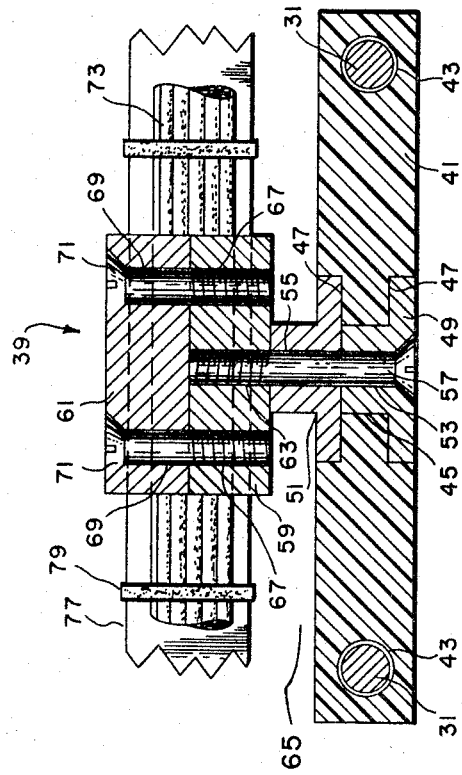
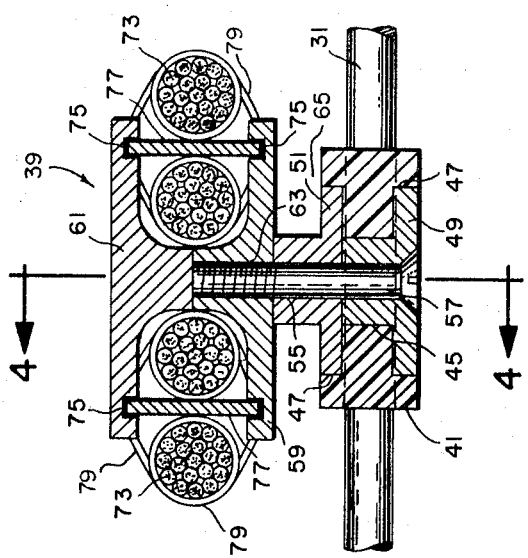

United States Patent Office 3,448,346
Patented June 3, 1969

3,448,346
EXTENSIBLE CABLE SUPPORT
James E. Webb, Administrator of the National Aeronautics and Space Administration, with respect to an invention of David J. McHaffie, Anaheim, Calif.
Filed June 27, 1967, Ser. No. 649,359
Int. Cl. H02b 9/00
U.S. Cl. 317—122          5 Claims

ABSTRACT OF THE DISCLOSURE

A means for supporting a flexible conductor cable between drawers or racks holding electronic equipment and the cabinet assembly that houses the drawers or racks. A track is installed beneath a drawer and extends the length thereof and somewhat behind the drawer and a plurality of swiveled clamp assemblies slide on the track. The cable folds in a sinuous pattern from side to side of the track and is clamped by the swiveled clamps at intervals where it crosses the track transversely. When the drawer travels in and out of the cabinet the cable is permitted to fold and unfold while remaining firmly clamped to the sliding swiveled clamps thus keeping the cable well supported and preventing entanglement, chafing and twisting.

---

The invention described herein was made in the performance of work under a NASA contract and is subject to the provisions of Section 305 of the National Aeronautics and Space Act of 1958, Public Law 85-568 (72 Stat. 435; 42 U.S.C. 2457).

Background of the invention

This invention relates generally to supporting devices for extensible cables and more particularly to a means for supporting a conductor cable between an electronic equipment drawer and the cabinet assembly that houses the drawer.

Electronic components are often permanently mounted and operated within sliding drawers or racks of cabinet assemblies. Electrical conductors extend from some point on the drawers or racks to a junction on the cabinet structure and the drawers or racks are regularly pulled for inspection, operation and maintenance of the electronic equipment contained therein.

In the case of intricate electronic equipment, numerous conductors are required between the drawers and the cabinet chassis, and these conductors are typically tied together to form a cable and sometimes the conductors and points of connection are such as to require the formation of several cables extending from the drawer to the cabinet chassis. It is evident that unless such cables are especially supported, entanglement, twisting, and chafing of the conductors will result and eventually short circuiting between the conductors will occur.

Previous means to prevent tangling, twisting and chafing of cables extending between sliding drawers and cabinets include cables which form a coil that expands and contracts upon opening and closing of the drawer, as well as pleated cables that also expand and contract upon travel of the drawer. Pleated cables have been found to produce intolerable stress concentration at the joints as well as lacking the desired stability during travel of the electronic equipment drawer while coiled cables occupy excessive space and tend to become entangled with coiled cables of adjacent assemblies.

Summary of the invention

Briefly described, the invention comprises a track that is mounted underneath a sliding drawer substantially vertically aligned with the longitudinal axis of the drawer. The track guides and supports a plurality of slides that carry a swiveled clamp for clamping a cable extending from a bracket on the drawer to the cabinet assembly. When the drawer is closed the cable folds in a sinuous pattern underneath the drawer and above the track. The cable is clamped to the swiveled clamps at points between the folds of the cable where the cable traverses the track and when the drawer is opened the cable unfolds while the slides move along the track and the clamps swivel imparting the desired freedom of movement to the cable while keeping the cable clamped firmly in all positions of extension and retraction.

According to one aspect of the invention a flexible supporting element is positioned between the cable conductors giving strength to the cable and preventing it from sagging unduly on either side of the track.

Accordingly, it is a general object of the present invention to provide an improved device for supporting an extensible cable.

A more specific object of the invention is to provide a durable, reliable and simple means for permitting a cable to fold and unfold without sagging, becoming twisted, entangled or chafed and without requiring an undue amount of space.

Another object of the invention is to provide a means for supporting a large number of conductors between a drawer containing intricate electronic equipment and the cabinet assembly housing the drawer so that the conductors will extend and retract frequently over a long period of time without becoming entangled, chafed and otherwise deformed.

These and other objects and advantages of the invention will become apparent upon reference to the following specification, attendant claims and drawings:

Brief description of the drawing

FIGURE 3 is an enlarged cross sectional view of a slide and clamp assembly.

FIGURE 4 is a cross sectional view of the slide and clamp assembly taken along line 4—4 of FIGURE 3.

Description of the preferred embodiment

Figure 1:
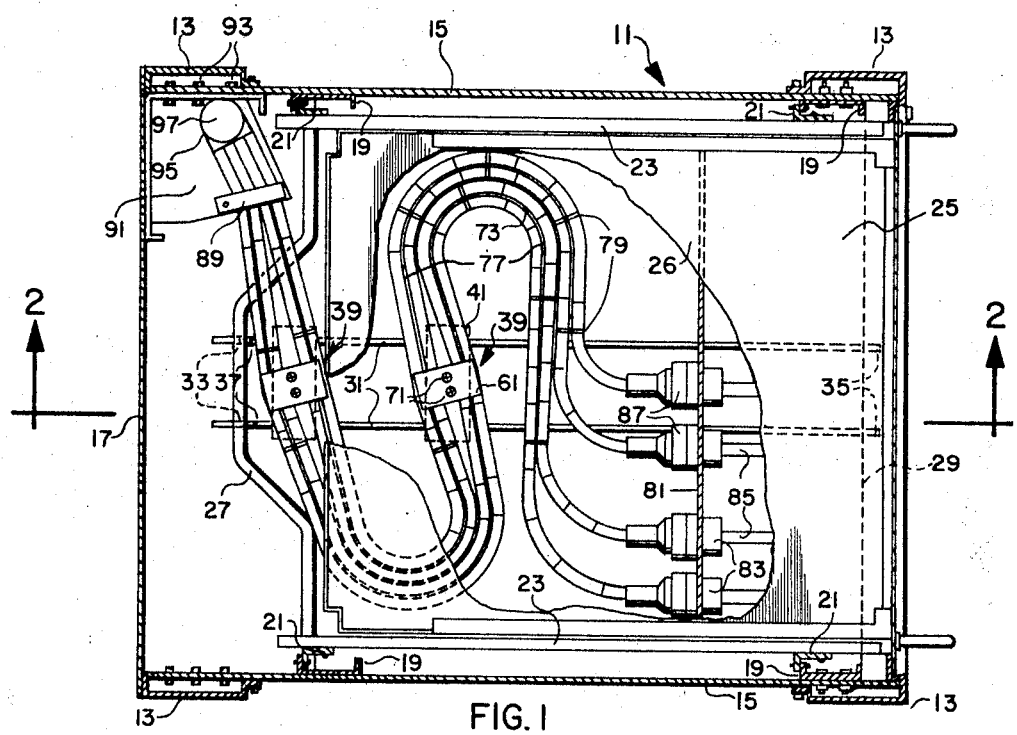
FIGURE 1 is a cross sectional view of a cabinet showing a drawer for containing electronic equipment with the bottom of the drawer broken away to show an extensible and retractable cable supported underneath the drawer, the drawer being in the closed position.

Referring to FIGURE 1 therein is shown in cross section a cabinet 11 comprising four vertical frame members 13, side panels 15 and a rear panel 17, the panels being joined to the frame members by welding, screws or other appropriate means. Enclosed within the cabinet 11 are four additional frame members 19 to which are secured as by brackets 21 a pair of guide rails 23 which support a drawer 25 adapted for containing electronic equipment (not shown) so as to permit the drawer 25 to travel in and out of the cabinet enclosure. Extending transversely of the cabinet 11 in a plane underneath a bottom 26 of the drawer 25 and joined as by welding or otherwise joining its ends to a pair of the frame members 19, is a yoke-shaped bar 27. Near the front of the cabinet 11 extending transversely thereof and in horizontal alignment with the bar 27 is a second bar 29 (see FIGURE 2) extending between a pair of frame members 19 and secured thereto.

A pair of guide rods 31 extend between the bar 27 and the bar 29 and are installed by inserting the rods through holes 33 in the bar 27 and positioning end portions of the rods in blind holes 35 in the bar 29. The guide rods are secured in place by cotter pins 37 permitting quick installation and removal of the guide rods. The guide rods 31 form a track for a plurality of slide and swiveled clamp assemblies 39 that are installed on the guide rods 31. As shown in detail in FIGURES 3 and 4, each slide and clamp assembly 39 comprises a rectangular shaped slide 41 provided with a pair of holes 43 that correspond to and receive the guide rods 31. The slides 41 are preferably made of Teflon and the guide rods 31 preferably made of stainless steel so that the slides 41 will readily slide over the rods 31 in the absence of lubrication or bearings.

The slide 41 has a vertical hole 45 in the center thereof which opens at each end into opposed circular recesses 47. Within the recesses 47 are fitted the circular bases of swivels 49 and 51 having respective openings 53 and 55 therethrough to receive a screw 57 with the main body portion of the swivel 49 extending through the hole 45 and the main body portion of the swivel 51 projecting above the slide 41. In order to assure smooth rotation of the swivels 49 and 51 in the slide 41 it is well to make the swivels of stainless steel.

Superposed on the swivel 51 are a pair of clamp elements 59 and 61, the clamp element 59 having a threaded hole 63 that receives the threaded end of the screw 57 to secure the slide 41 to the clamp elements 59 and 61. The vertically projecting main body portion of the swivel 51 effects a space 65 between the slide 41 and the clamp element 59 so that the clamp elements 59 and 61 may rotate easily without being in contact with the slide 41 under pressure exerted by the screw 57.

On both sides of the hole 63 in the clamp elements 59 is a threaded hole 67 (see FIGURE 4) that corresponds with smooth holes 69 extending through the clamp element 61. A screw 71 extends through each of the holes 69 and threads into the holes 67 providing a means for clamping cables 73. Opposed grooves 75 are provided in the clamp elements to receive the upper and lower edges of a reinforcing element 77 that is flexible and may extend substantially the full length of the extensible and retractable cable 73 so as to prevent undue sagging of the cable on either side of the guide rods 31. The cables 73 are tied intermittently to the reinforcing elements 77 by ties 79.

Figure 2:
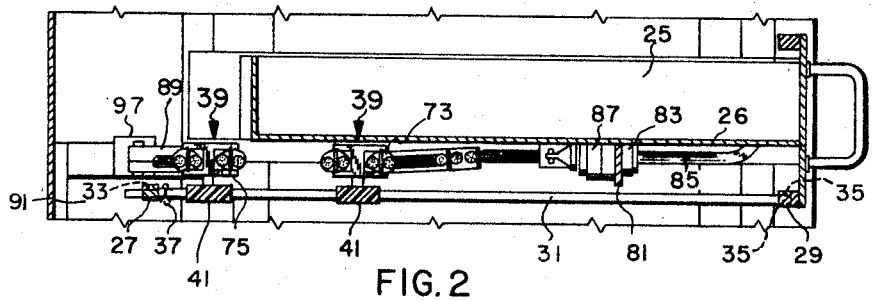
FIGURE 2 is a fragmentary cross sectional view taken along line 2—2 of FIGURE 1.

Referring again to FIGURES 1 and 2, the drawer 25 has a bracket 81 across the bottom thereof that supports electrical receptacles 83 that are joined to respective cables 85 that are in turn connected to the electronic equipment (not shown) contained within the drawer 25. Cables 73 which constitute the extensible cables between the sliding drawer and the cabinet structure are provided with plugs 87 that plug into the respective receptacles 83. The cables 73 fold on each side of the guide rods 31 and are tied together in pairs by ties 79 and one pair of cables are clamped on each side of the swivel of the slide and swivel clamp assembly as indicated in FIGURES 1, 2 and 3. The end of the extensible cable 73 that connects into the cabinet wiring is bound by a strap 89 and secured within a bracket 91 mounted by screws 93 to the cabinet structure, and the bracket 91 has a receptacle 95 that receives a plug 97 through which the cables 73 are connected into the cabinet wiring system.

With the arrangement described above, when the drawer 25 is opened and closed the cables 73 are permitted to unfold and fold while being firmly clamped and supported by the slide and swiveled clamp assemblies 39. Entanglement, chafing and twisting is entiring avoided and sagging of the cable is prevented by the reinforcing elements 77.

Obviously, many modifications and variations of the present invention are possible in the light of the above teachings. It is therefore to be understood that within the scope of the appended claims the invention may be practiced other than as specifically described.

What is claimed is:

1. In a cabinet containing an electronic equipment drawer, with an extensible electrical conductor connected to said drawer, means for supporting said conductor comprising:
    (a) a track mounted in said cabinet under said drawer and being spaced from the bottom of said drawer;
    (b) said track extending longitudinally in the direction of movement of said drawer with a portion of said track extending rearwardly of said drawer when said drawer is in the closed position;
    (c) a slide slidably attached to said track for movement longitudinally of said track;
    (d) swiveled clamp means carried by said slide;
    (e) said conductor being clamped to said clamp means;
    (f) the length of said conductor between said clamp means and said connection to said drawer including a curved configuration whereby said conductor may extend and contract upon movement of said drawer while being supported by and permitted to turn freely about said swiveled clamp;
    (g) said curved configuration of said conductor being disposed between said track and the bottom of said drawer.

2. The invention as defined in claim 1 including a plurality of said slide and clamp means attached to said track with said conductor being disposed in a sinuous configuration bending alternately on opposite sides of said track and being clamped to said clamp means at points where said conductor traverses said track.

3. The invention as defined in claim 1 including a plurality of conductors assembled to form a plurality of cables, said clamp means including means for clampingly securing each of said cables.

4. The invention as defined in claim 3 wherein said cables are intermittently tied together and wherein an elongated reinforcing element is incorporated and tied together with said cables to prevent sagging of said cables.

5. The invention as defined in claim 4 wherein said clamp means includes means for receiving and clamping said reinforcing element.

References Cited
UNITED STATES PATENTS

| | | | |
|---|---|---|---|
| 2,865,979 | 12/1958 | Klassen | 174—69 |
| 2,885,600 | 5/1959 | Wiseman | 317—122 XR |
| 3,088,054 | 4/1963 | Meyer | 317—99 XR |
| 3,219,750 | 11/1965 | Davies | 174—69 |
| 3,289,983 | 12/1966 | Mennerdahl | 174—69 |
| 3,335,326 | 8/1967 | Bonin et al. | 74—69 XR |

ROBERT K. SCHAEFER, *Primary Examiner.*

J. R. SCOTT, *Assistant Examiner.*

U.S. Cl. X.R.

174—69